US011664976B2

(12) United States Patent
Andersson

(10) Patent No.: US 11,664,976 B2
(45) Date of Patent: May 30, 2023

(54) METHOD AND DEVICES FOR CREATING REDUNDANCY AND ENCRYPTION USING MOJETTE TRANSFORM

(71) Applicant: ZEBWARE AB, Stockholm (SE)

(72) Inventor: Johan Andersson, Stockholm (SE)

(73) Assignee: ZEBWARE AB, Stockholm (SE)

( * ) Notice: Subject to any disclaimer, the term of this patent is extended or adjusted under 35 U.S.C. 154(b) by 162 days.

(21) Appl. No.: 17/103,204

(22) Filed: Nov. 24, 2020

(65) Prior Publication Data

US 2021/0160051 A1 May 27, 2021

Related U.S. Application Data

(60) Provisional application No. 62/939,895, filed on Nov. 25, 2019.

(51) Int. Cl.
*H04L 9/06* (2006.01)

(52) U.S. Cl.
CPC ............ *H04L 9/065* (2013.01); *H04L 9/0618* (2013.01); *H04L 2209/16* (2013.01); *H04L 2209/20* (2013.01)

(58) Field of Classification Search
CPC ... H04L 9/0618; H04L 9/065; H04L 2209/16; H04L 2209/20
See application file for complete search history.

(56) References Cited

U.S. PATENT DOCUMENTS

| | | | |
|---|---|---|---|
| 2011/0116628 A1 | 5/2011 | Wack et al. | |
| 2017/0353302 A1* | 12/2017 | Fernandez | H04L 9/16 |
| 2019/0191181 A1* | 6/2019 | Evenou | H04N 19/42 |

OTHER PUBLICATIONS

Kingston, A., Geometric Shape Effects in Redundant Keys Used to Encrypt Data Transformed by Finite Discrete Radon Projections, 2005, IEEE Computer Society, p. 3 (Year: 2005).*
Bernstein, "ChaCha, a variant of Salsa20", Workshop Record of SASC, 2008, 6 pages.
Verbert, et al. "Analysis of Mojette Transform Projections for an Efficient Coding", Workshop on Image Analysis for Multimedia Interactive Services (WIAMIS), Apr. 2004, 5 pages.
International Search Report and Written Opinion dated Mar. 19, 2021 in PCT/IB2020/001024, citing documents AA, AX and AY therein, 16 pages.
Kingston, A., et al., "Mojette-based Security" In: "The Mojette Transform: Theory and Applications", Mar. 30, 2009, John Wiley & Sons Inc., XP055784335, pp. 215-240, Section 10.1 Section 10.4.2.
Autrusseau, F., et al., "A joint multiple description-encryption Image algorithm", Image Processing , 2006 IEEE International Conference ON. Retrieved from the Internet: URL: https://ieexplore.ieee.org/stampPDF/getPDF.jsp?tp=&arnumber=1247233&ref=aHr0cHM0Ly9pZWV1eHBsb3JILmllZWUb3JnL2RvY3VtZW50LzEyN DcyMzM=>, retrieved on Mar. 11, 2021], vol. 3, Oct. 2006, XP055784540, pp. 269-272.

* cited by examiner

*Primary Examiner* — Daniel B Potratz
*Assistant Examiner* — D'Arcy Winston Straub
(74) *Attorney, Agent, or Firm* — Oblon, McClelland, Maier & Neustadt, L.L.P.

(57) ABSTRACT

A method for hyper security encoding includes receiving data to be encrypted, and padding the data to be encrypted with padding data to avoid un-obfuscated bits after encryption. The method also includes encrypting, with a Mojette Transform, the data to be encrypted after the data to be encrypted is padded with the padding data, and outputting a result of the encryption as encrypted data.

16 Claims, 10 Drawing Sheets

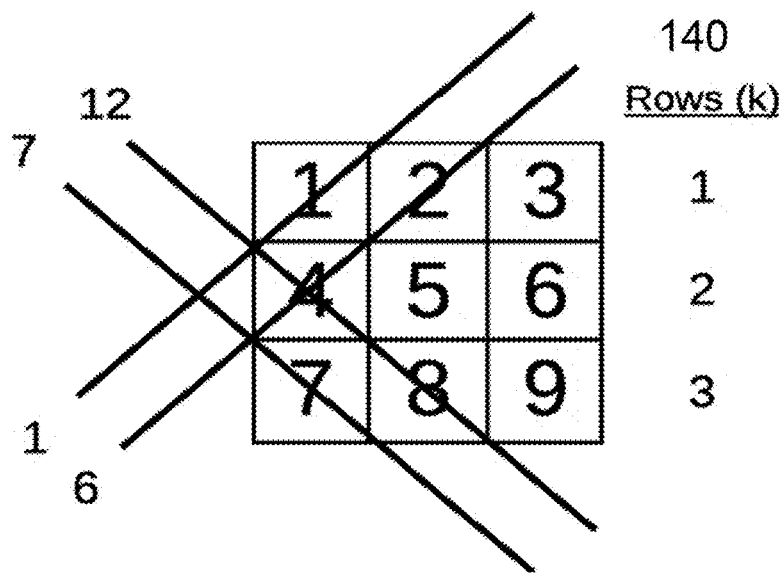

Fig 1a

| | Configuration | Comment |
|---|---|---|
| Redundancy | k: Number of data fragments<br>m: Number of parity fragments<br>m-key: Saved y/n | m-key (ephemeral chunk) to be saved as a redundancy chunk or not |
| Performance | Basic<br>Efficiency<br>Balanced<br>Performance | Configuration affects the calculation of key length |
| Encryption | HSE type<br>• Horizontal Padding<br>• Vertical Padding<br>• Fortification<br>Key handling<br>• Single key<br>• Multiple keys<br>  ○ Key configuration<br>    • Separate<br>    • Combined | Generating multiple keys to work in combination means that two keys are needed for the decryption |
| Decryption | Secret<br>• m-key<br>Private<br>• m-key<br>Public<br>• m-key | If above m-key is saved, a configuration can be set to use it or not in different environments. Standard is to regenerate the key |

| 1 | 2 | 3 | 4 | 5 |
|---|---|---|---|---|
| 6 | 7 | 8 | 9 | 10 |

| P(1,1) | Row | Key | | | | | | | |
|---|---|---|---|---|---|---|---|---|---|
| | 1 | 70 | 1 | 2 | 3 | 4 | 5 | 72 | |
| | 2 | | 71 | 6 | 7 | 8 | 9 | 10 | 73 |
| Bin Sum | | 70 | 72 | 8 | 10 | 12 | 14 | 82 | 73 |

| P(-1,1) | Row | Key | | | | | | | |
|---|---|---|---|---|---|---|---|---|---|
| | 1 | | 70 | 1 | 2 | 3 | 4 | 5 | 72 |
| | 2 | 71 | 6 | 7 | 8 | 9 | 10 | 73 | |
| Bin Sum | | 71 | 76 | 8 | 10 | 12 | 14 | 78 | 72 |

| P(1,1) | Row | | | | | | | | |
|---|---|---|---|---|---|---|---|---|---|
| | 1, key | 70 | 71 | 72 | 73 | 74 | | | |
| | 2 | | 1 | 2 | 3 | 4 | 5 | | |
| | 3 | | | 6 | 7 | 8 | 9 | 10 | |
| | 4, Key | | | | 75 | 76 | 77 | 78 | 79 |
| Bin Sum | | 70 | 72 | 80 | 158 | 162 | 91 | 88 | 79 |

| P(-1,1) | Row | | | | | | | | |
|---|---|---|---|---|---|---|---|---|---|
| | 1, key | | | | 70 | 71 | 72 | 73 | 74 |
| | 2 | | | 1 | 2 | 3 | 4 | 5 | |
| | 3 | | 6 | 7 | 8 | 9 | 10 | | |
| | 4, Key | 75 | 76 | 77 | 78 | 79 | | | |
| Bin Sum | | 75 | 82 | 85 | 158 | 162 | 86 | 78 | 74 |

| | | Row | | | | | | |
|---|---|---|---|---|---|---|---|---|
| 530 | P(1.1) | 1, key | 70 | 71 | 72 | 73 | 74 | 75 |
| | | 2 | 1 | 2 | 3 | 4 | 5 | |
| | | 3 | | 6 | 7 | 8 | 9 | 10 |
| 531 | Bin Sum | | 71 | 79 | 82 | 85 | 88 | 85 |

| | | Row | | | | | | |
|---|---|---|---|---|---|---|---|---|
| 532 | P(-1.1) | 2 | | 1 | 2 | 3 | 4 | 5 |
| | | 3 | 6 | 7 | 8 | 9 | 10 | |
| | | 4, Key | 76 | 77 | 78 | 79 | 80 | 81 |
| 533 | Bin Sum | | 82 | 85 | 88 | 91 | 94 | 86 |

Fig 5d

METHOD AND DEVICES FOR CREATING REDUNDANCY AND ENCRYPTION USING MOJETTE TRANSFORM

CROSS-REFERENCE TO RELATED APPLICATIONS

This application claims the benefit of priority to provisional application No. 62/939,895, filed Nov. 25, 2019. The entire contents of this application are incorporated herein by reference.

BACKGROUND

Field

Encryption is used to protect information from unauthorized access. Encryption involves the conversion of sensitive information into a cipher-text using an algorithm. Cryptography first uses the encrypt operation to scramble (write) the data and then the decrypt operation to unscramble (read) the encrypted data back to its original state. Only users with knowledge how to decrypt, or unscramble the data back to the original state, can read the data.

The Advanced Encryption Standard (AES) was created by the National Institute of Standards and Technology (NIST) and became an effective US federal government standard in 2002, after being in development for five years. There are two basic techniques for encrypting data, symmetric encryption also known as "secret key encryption" and asymmetric encryption known as "public key encryption". AES is a symmetric block cipher used by individuals and corporations alike to protect classified or otherwise valuable information.

Orchesto® GSE the present standard encryption method in Orchesto® uses the AES block cipher with a key length of 256-bit having 14 rounds, where rounds correspond to multiple processing steps, which include permutation and substitution of the encrypted text, which transforms it into its encrypted form, adequate to protect classified data up to "Top Secret" the highest official level in the United States Government's classification system.

Hyper Security Encryption (HSE) is an encryption method using the Mojette transform, the algorithm to enable a flexible, redundant and hyper secure data encryption for specific use-cases.

The erasure code library Zebware Erasure Code (ZebEC) uses the Mojette transform which is a discrete and exact version of the Radon transform. The Mojette transform is by nature a non-systematic code and parity fragments (m) have a larger size $(1+\varepsilon)$ than corresponding systematic fragments (k).Epsilon $\varepsilon>0$ implies that parity fragments contains more information than data fragments.

DESCRIPTION OF THE RELATED ART

Businesses and governments are shifting more and more workloads to the cloud, but many organizations remain resistant to the cloud's considerable attractions due to concerns about data security.

Compliance violations (GDPR, HIPAA)
Identity theft
Malware infections and data breaches Encryption to secure the data is often an additional function to an application that brings additional risks to the operation. Using HSE to integrate the encryption with the redundancy created by the Mojette Transform erasure code combines two sophisticated features into one operation. This combination greatly improves speed and brings down complexity of the implementation. HSE both technically and from the view of the end-user, guarantees both durability (through erasure coding) and security (through encryption) of the data.

HSE encryption technologies:
Horizontal Padding
Vertical Padding
Fortification of Fragments Different algorithms can be used to create encryption functionality but the preferred algorithm is the Mojette Transform (MT) a discrete and exact version of the Radon Transform. The Mojette Transform is by nature a non-systematic code and the parity chunks have a larger size $(1+\varepsilon)$ than corresponding systematic chunks (k), where epsilon is $\varepsilon>0$ making the parity chunks (m) containing more information than data chunks. The Mojette Transform is by design highly performant also on CPUs without advanced acceleration features and delivers excellent results even on less potent CPUs, but takes full advantage of modern CPU features when present. MT is also portable between different hardware platforms, which means that it can be used in all architectural layers such as data centers, client applications and edge devices. MT is an algorithm that is rateless meaning that it is possible to set any redundancy level to a specific use case for optimal functionality, and add or reduce the redundancy level without noticeable performance impact when tiering the data from hot to cold storage or vice versa. See the paper "Pierre Verbert, Vincent Ricordel, Jean-Pierre Gu'edon. ANALYSIS OF MOJETTE TRANS-FORM PROJECTIONS FOR AN EFFICIENT CODING. Workshop on Image Analysis for Multimedia Interactive Services (WIAMIS, April 2004, Lisboa, Portugal. 2004. <hal-00451338>.

There is a need for an improved encryption solution combining the implementation of redundancy, encryption and performance into software or hardware. HSE using Mojette Transform Projections (MT) for the next generation cloud native solutions and work in distributed frameworks over networks for redundant and hyper secure, highly performant use-cases.

BRIEF DESCRIPTION OF THE DRAWINGS

FIG. 1a shows a graphical illustration of the Mojette Transform, including input data chunked into a 3×3 block with 4 bins calculated for two projections.

FIG. 1b shows a table of the configuration input to the HSE

FIG. 2a shows an representation of the data input.

FIG. 2b shows input data from FIG. 2a after using k=2 forming the data matrix having two rows FIG. 3a shows a data matrix having two rows k=2

FIG. 3b shows a data matrix having two rows k=2 with a HSE horizontal padding

FIG. 3c shows the HSE horizontal padding in FIG. 3b calculations for projection p(1,1) and p(−1,1)

FIG. 4a shows a data matrix having two rows k=2

FIG. 4b shows a data matrix having two rows k=2 with a HSE vertical padding

FIG. 4c shows the HSE vertical padding in FIG. 4b calculations for projection p(1,1) and p(−1,1)

FIG. 5a shows a data matrix having two rows k=2

FIG. 5b shows stream cipher and the data matrix to be encrypted

FIG. 5c shows HSE fortification using stream cipher and data matrix from FIG. 5b including illustrative projections from p(1,1) and p(−1,1)

FIG. 5d shows the HSE fortification padding in FIG. 5b calculations for projection p(1,1) and p(−1,1)

DETAILED DESCRIPTION

Figure 6:
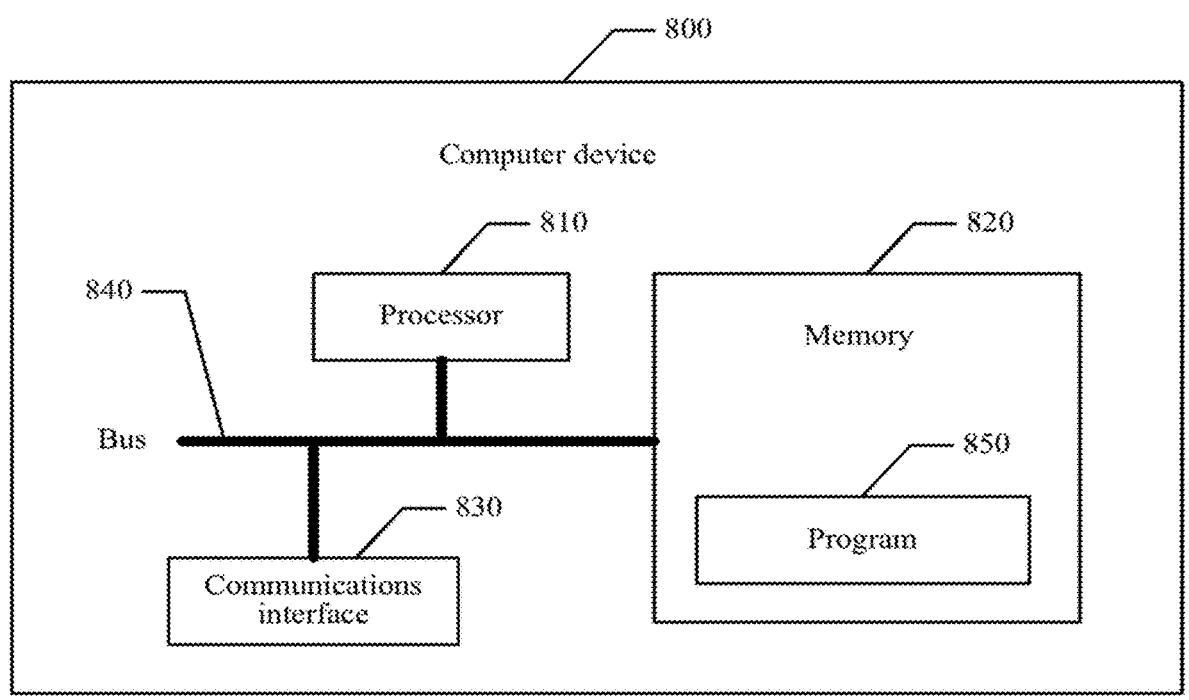
FIG. 6 is a schematic illustration of a computer implementation according to an embodiment of the present disclosure.

The embodiments described above are merely given as examples, and it is understood that the proposed technology is not limited thereto. It is understood by those skilled in the art that various modifications, combinations and changes may be made to the embodiments without departing from the present scope as defined by the appended claims. In particular, different part solutions in the different embodiments can be combined in other configurations, where technically possible.

Conventionally, a Mojette Transform does not protect pixels at the edge of the configured coding block. This causes multiple un-obfuscated pixels to be scattered throughout the computed parity fragments. In FIG. 1a, 110 the data object is chunked up into three chunks 140 rows 1, 2 and 3. These rows are then subject to a Mojette Transformation (MT) into bins 120 and 130. The bins 120 shows that the edge pixel 7 is un-obfuscated and the same will be for the last pixel 3 for the projection p(−1,1). For the bins 130 in projection p(1,1) un-obfuscated pixels will here be 1 and 9.

To eliminate the possibility of having un-obfuscated data, HSE uses random generated data in different paddings to the data matrix, before performing the MT operation, using a key generation with a stream cipher, a symmetric key cipher where plaintext digits are combined with a pseudorandom cipher digit stream (keystream).

In stream cipher, each plaintext digit is encrypted one at a time with the corresponding digit of the keystream, to give a digit of the cipher-text stream. Since encryption of each digit is dependent on the current state of the cipher, it is also referred to as state cipher. In practice, a digit is typically a bit and the combining operation an exclusive-or (XOR).

An advantage of stream ciphers in military cryptography, or any other cryptography, is that the cipher stream can be generated in a separate box that is subject to strict security measures and fed to other devices hosting an application, which will perform the XOR operation as part of their function. The latter device can then be designed and used in less stringent environments.

Figures 4A, 4B:
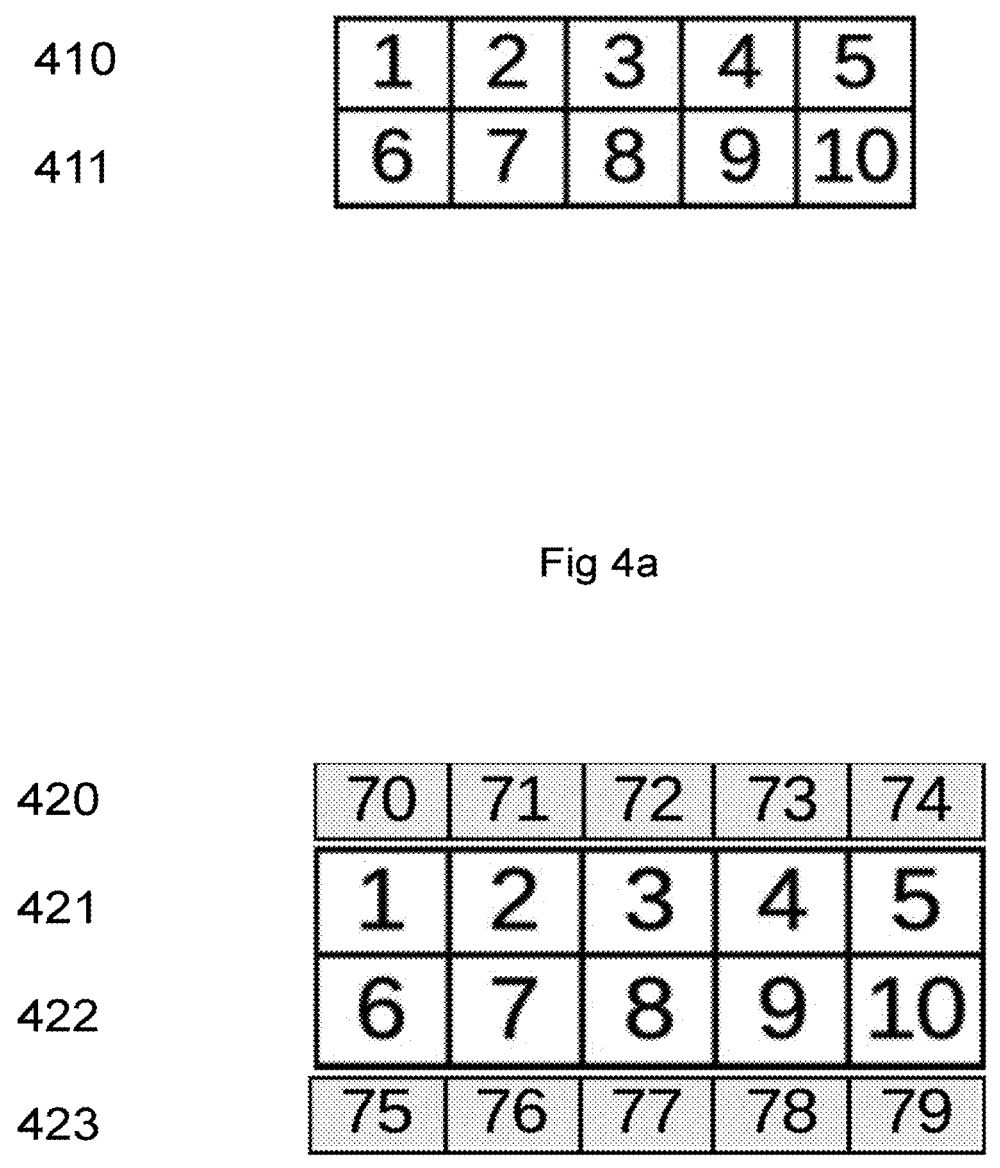
Figures 5A, 5B:
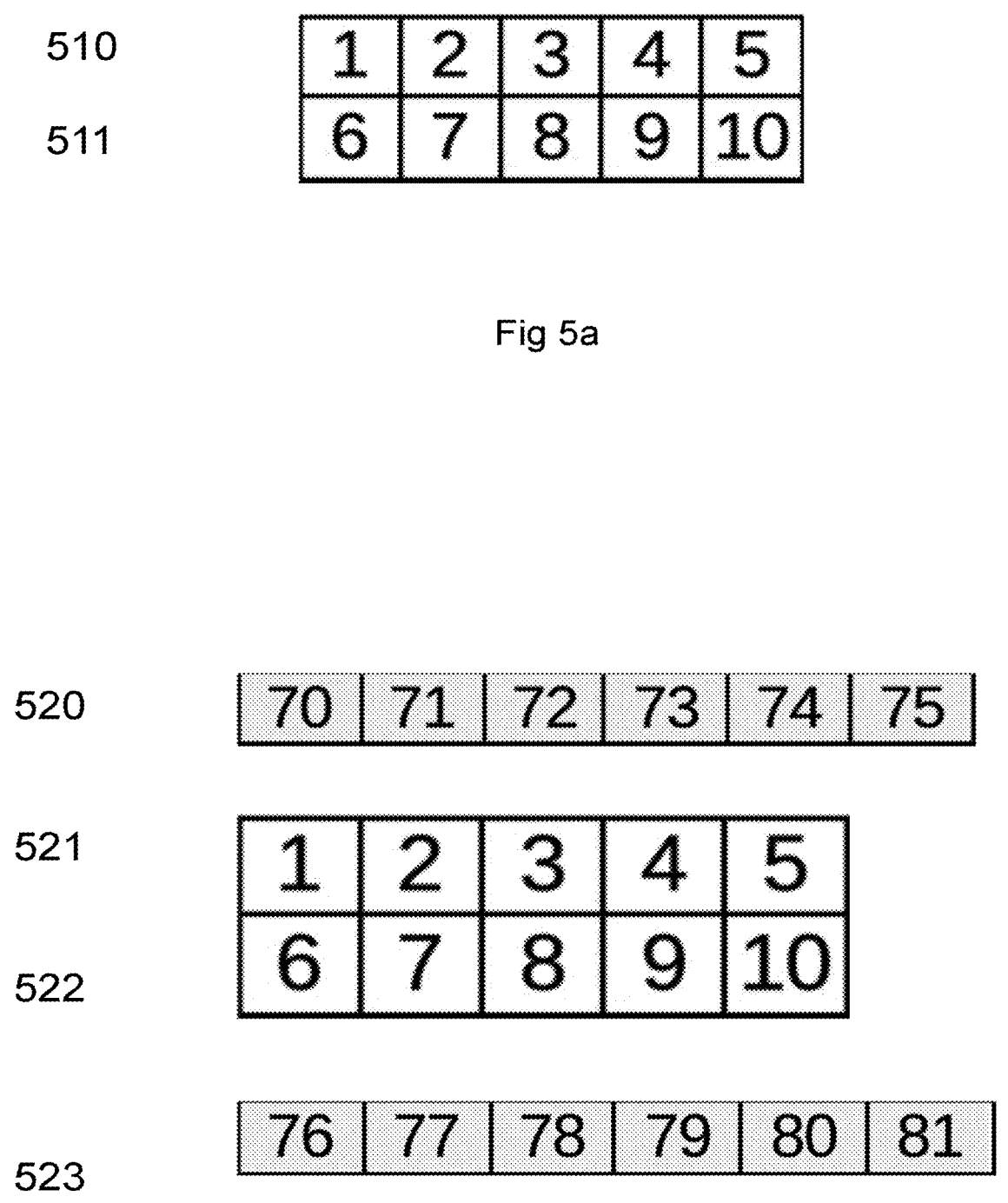

One preferred design example is to use a stream cipher like ChaCha20 to generate the ephemeral chunks to be used in combination with MT operation. ChaCha20 is a 20-round stream cipher, consistently faster than AES and is recommended by the designer for typical cryptographic applications. In all examples for simplification, the keys are designed to be generated by stream ciphers. Examples of keys are shown in FIG. 3b, FIG. 4b, FIG. 5b.

FIG. 1b shows the input configuration data. Redundancy 115 will now also have a component m-key that is the key where a decision is whether this information should be stored as a standard chunk or not. In the case where the in-key is stored, traditional regeneration of the key is not necessary if the m-key is available, but if the m-key is not available, the in-key could be regenerated and used for the MT operation. The number of data fragments and parity fragments can now be calculated to meet specified redundancy of the data.

k=data fragments=The number of fragments required by the erasure code to reassemble the original data m=parity fragments=The number of fragments that can be lost without impacting the availability of the data k+m=Width=The configured number of fragments generated by the erasure code when processing input data k/(k+m)=Storage efficiency In FIG. 1b, 125 is the input for the Performance of the MT operation to be performed onto data. Different settings will have an impact on the length of the key that needs to be generated in order not to have any edge un-obfuscated data shown in the parity fragments after the MT operation.

In FIG. 1b, 135 the encryption needs to be configured giving input about method to use and if single or multiple keys should be generated. HSE uses three methods for encryption of data Horizontal padding Vertical padding Fortification Horizontal padding shown in FIG. 3b, Vertical padding shown in 4b, and Fortification is shown in FIG. 5c. Single or multiple keys and how they are combined are the next input needed. A single key is how encryption traditionally works, where one key will give access to the data. Using instead multiple keys a decision can be made if they separately should be able to access the data or if this must be made in combination with the use of the multiple keys. Using multiple keys one key could also be a master key and if not present the data is totally obfuscated to access. Using multiple keys that need to be in combination to gain access to data can protects organizations from personal errors.

In FIG. 1b, 145 the decryption configuration is given for the m-key handling in different environments. Traditionally networks can be categorized into secret, private and public security levels and different settings to protect the data can here be applied.

FIG. 2a, 210 shows a standard data input to be handled by the HSE MT operation. In the following examples this data will serve as the standard input. The data 210 is chunked up into two rows 220 and 221 having k=2. This data matrix will be used as a standard in the following examples.

HSE horizontal padding protects edge pixel information and secures that all data in MT parity fragments are obfuscated. In FIG. 3a the data matrix with two rows 310 and 311 are horizontally padded in FIG. 3b 320 and 321 with cipher digits 322 and 323. This protects HSE to output any obfuscated after an MT operation on the data matrix FIG. 3a. In FIG. 3c a calculation using the data matrix together with the cipher text that are grey pixels in the calculation sheet, from FIG. 3b is performed for the projections p(1,1) and p(−1,1). This calculation shows that HSE horizontal padding protects the MT edges to show-un-obfuscated information.

HSE vertical padding protects edge pixel information and secures that all data in MT parity fragments are encrypted. Vertical padding consists of two different types of chunks, data chunks and ephemeral chunks. The ephemeral chunks are generated from a data stream seeded by a key, shown in the FIG. 4b, 420 and 423. FIG. 4a shows the original data matrix consisting of two rows 410, 411 given by k=2, that will be encrypted using HSE with vertical padding before and after the two rows 421, 422. The ephemeral chunks can either be stored in the cloud as parity fragments, making it possible to decode the data without a key or they can be regenerated from the key during decoding. In FIG. 4c performing the HSE operation onto the data matrix in FIG. 4b is shown. As shown in both projections p(1,1) and p(−1,1) all bin sums are greater than 10 indicating that all matrix pixels are correctly encrypted using the stream cipher FIG. 4*b*, 420 and 423.

HSE fortification protects edge pixel information and secures that all data in HSE parity fragments are encrypted. Fortification consists of two different types of chunks, data chunks and ephemeral chunks. The ephemeral chunks are generated from a data stream seeded by a key, shown in the FIG. 5*b*, 520 and 523. FIG. 5*a* shows the original data matrix consisting of two rows 510, 511 given by k=2, that will be encrypted using HSE with fortification padding before and after the two rows 521, 522. Fortification shown in FIG. 5*c* shows that top cipher row 520 is used for the p(1,1) projection and the p(−1,1) uses the stream cipher 523 for the HSE encryption of the original data matrix FIG. 5*a*. In FIG. 5*d* the HSE operation is shown as a calculation in a spreadsheet showing that all bins in both the p(1,1) and p(−1,1) are greater than 10, proof of that all pixels in the data matrix FIG. 5*a* are encrypted with the stream cipher. The ephemeral chunks 530, 531, 532, 533 can either be stored in the cloud as parity fragments, making it possible to decode the data without a key or they can be regenerated during decoding.

Referring to FIG. 6, an embodiment of the present disclosure further provides a computer device 800, including a processor 810, a memory 820, a communications interface 830, and a bus 840. One of ordinary skill will recognize that the processor 810, memory 820, communication interface, and bus 840 may each be implemented by circuitry that performs their corresponding functions.

The memory 820 is configured to store a program 850, and the processor 810 is connected to the memory 820 by using the bus 840. When the computer device 800 is running, the processor 810 executes the program 850 stored in the memory 820, so that the computer device 800 performs the functions described above. The processor 810 is configured to perform the functions described above, with reference to other Figures.

The memory 820 may include a high-speed random access memory (RAM) memory. Optionally, the memory 820 may further include a non-volatile memory. For example, the memory 820 may include a magnetic disk memory. Thus, the memory may be any non-transitory computer-readable medium without limitation.

The processor 810 may be a central processing unit (CPU), or the processor 810 may be an application-specific integrated circuit (ASIC), or the processor 810 may be one or more integrated circuits configured to implement the embodiments of the present disclosure.

A person of ordinary skill in the art may understand that all or some of the steps of the methods in the embodiments may be implemented by a program instructing relevant hardware. The program may be stored in a computer readable storage medium, such as a non-transitory computer readable storage medium. The storage medium may include a Read Only Memory (ROM), a RAM, a magnetic disk, or an optical disc.

There is a need for an improved encryption solution combining the implementation of redundancy, encryption and performance into software or hardware. HSE using Mojette Transform Projections (MT) for the next generation cloud native solutions and work in distributed frameworks over networks for redundant and hyper secure, highly performant use-cases.

The embodiments described above are merely given as examples, and it is understood that the proposed technology is not limited thereto. It can be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method of security encryption performed by a computing device, the method comprising:
   receiving, with circuitry of the computing device, data to be encrypted;
   generating, with the circuitry, padding data using an encryption algorithm;
   padding, with the circuitry of the computing device, the data to be encrypted with the padding data to avoid un-obfuscated bits after encryption;
   encrypting, by the circuitry of the computing device and using a Mojette Transform (MT), the data to be encrypted after the data to be encrypted is padded with the padding data; and
   outputting, by the circuitry of the computing device, a result of the encrypting step as encrypted data,
   wherein the data to be encrypted is arranged in rows and columns, and, in the padding step, the data to be encrypted is vertically padded with the padding data by adding a row of padding data before a first row of the data to be encrypted and adding another row of padding data after a last row of the data to be encrypted.

2. The method of claim 1, wherein, in the padding step, the data to be encrypted is padded with the padding data using fortification.

3. The method according to claim 1, further comprising receiving key data corresponding to at least one key to be used in encrypting the data to be encrypted.

4. The method according to claim 3, wherein the key data includes data of multiple keys to be used in encrypting the data to be encrypted.

5. The method according to claim 1, further comprising dividing the data to be encrypted into a plurality of chunks prior to encrypting step,
   wherein in the encrypting step, the plurality of chunks are encrypted using the MT.

6. The method according to claim 5, wherein the chunks are generated using a stream cipher.

7. The method according to claim 1, wherein a length of the padding data is computed based on a length of the data to be encrypted.

8. A computing device configured to perform secure encryption of data to be encrypted, the computing device comprising:
   circuitry configured to:
   receive the data to be encrypted;
   generate padding data using an encryption algorithm;
   pad the data to be encrypted with the padding data to avoid un-obfuscated bits after encryption;
   encrypt, using a Mojette Transform (MT), the data to be encrypted after the data to be encrypted is padded with the padding data; and
   output a result of the encrypting step as encrypted data,
   wherein the data to be encrypted is arranged in rows and columns, and, in the padding the data to be encrypted, the circuitry vertically pads data to be encrypted with the padding data by adding a row of padding data before a first row of the data to be encrypted and adding another row of padding data after a last row of the data to be encrypted.

9. The computing device according to claim 8, wherein the circuitry is configured to pad the data to be encrypted with the padding data by fortifying the data to be encrypted with the padding data.

10. The computing device according to claim 8, wherein the circuitry is further configured to receive key data corresponding to at least one key to be used in encrypting the data to be encrypted.

11. The computing device according to claim 10, wherein the key data includes data of multiple keys to be used in encrypting the data to be encrypted.

12. The computing device according to claim 8, wherein the circuitry is further configured to divide the data to be encrypted into a plurality of chunks prior to encrypting step, and in encrypting the data to be encrypted, the circuitry encrypts the plurality of chunks using the MT.

13. The computing device according to claim 12, wherein the circuitry is configured to generate the plurality of chunks using a stream cipher.

14. A method of security encryption performed by a computing device, the method comprising:
receiving, with circuitry of the computing device, data to be encrypted;
generating, with the circuitry, padding data using an encryption algorithm;
padding, with the circuitry of the computing device, the data to be encrypted with the padding data to avoid un-obfuscated bits after encryption,
encrypting, by the circuitry of the computing device and using a Mojette Transform (MT), the data to be encrypted after the data to be encrypted is padded with the padding data; and
outputting, by the circuitry of the computing device, a result of the encrypting step as encrypted data,
wherein the data to be encrypted is arranged in rows and columns, and, in the padding step, the data to be encrypted is horizontally padded with the padding data by adding a column of padding data before a first column of the data to be encrypted and adding another column of padding data after a last column of the data to be encrypted.

15. A computing device configured to perform secure encryption of data to be encrypted, the computing device comprising:
circuitry configured to:
receive the data to be encrypted;
generate padding data using an encryption algorithm;
pad the data to be encrypted with the padding data to avoid un-obfuscated bits after encryption;
encrypt, using a Mojette Transform (MT), the data to be encrypted after the data to be encrypted is padded with the padding data; and
output a result of the encrypting step as encrypted data,
wherein the data to be encrypted is arranged in rows and columns, and the circuitry is configured to pad the data to be encrypted with the padding data by horizontally padding the data by adding a column of padding data before a first column of the data to be encrypted and adding another column of padding data after a last column of the data to be encrypted.

16. A non-transitory computer-readable medium including computer-readable instructions that, when executed by circuitry of a computing device, cause the computing device to perform a method comprising:
receiving data to be encrypted;
generating padding data using an encryption algorithm;
padding the data to be encrypted with padding data to avoid un-obfuscated bits after encryption;
encrypting, using a Mojette Transform (MT), the data to be encrypted after the data to be encrypted is padded with the padding data; and
outputting a result of the encrypting step as encrypted data,
wherein the data to be encrypted is arranged in rows and columns, and, in the padding step, the data to be encrypted is vertically padded with the padding data by adding a row of padding data before a first row of the data to be encrypted and adding another row of padding data after a last row of the data to be encrypted.

* * * * *